US010846429B2

(12) United States Patent
Smith et al.

(10) Patent No.: US 10,846,429 B2
(45) Date of Patent: Nov. 24, 2020

(54) AUTOMATED OBSCURING SYSTEM AND METHOD (71) Applicant: Nuance Communications, Inc., Burlington, MA (US)

(72) Inventors: Kenneth William Douglas Smith, London (GB); Uwe Helmut Jost, Groton, MA (US); Jean-Guy Elie Dahan, Montreal (CA); Fabrizio Lussana, Turin (IT); Vittorio Manzone, Turin (IT); David Copp, Durham, NH (US)

(73) Assignee: Nuance Communications, Inc., Burlington, MA (US)

( * ) Notice: Subject to any disclaimer, the term of this patent is extended or adjusted under 35 U.S.C. 154(b) by 158 days.

(21) Appl. No.: 16/038,726

(22) Filed: Jul. 18, 2018

(65) Prior Publication Data
US 2019/0026494 A1 Jan. 24, 2019

Related U.S. Application Data (60) Provisional application No. 62/535,101, filed on Jul. 20, 2017.

(51) Int. Cl.
G06F 21/62 (2013.01)
G06F 11/30 (2006.01)
G06F 40/263 (2020.01)

(52) U.S. Cl.
CPC ...... *G06F 21/6254* (2013.01); *G06F 11/3068* (2013.01); *G06F 40/263* (2020.01)

(58) Field of Classification Search
CPC . G06F 21/6254; G06F 11/3068; G06F 40/263
See application file for complete search history.

(56) References Cited

U.S. PATENT DOCUMENTS

| 5,146,439 A | 9/1992 | Jachmann et al. |
| 5,519,808 A | 5/1996 | Benton, Jr. et al. |
| 5,602,982 A | 2/1997 | Judd et al. |
| 5,748,888 A | 5/1998 | Angelo et al. |
| 5,812,882 A | 9/1998 | Raji et al. |
| 5,857,212 A | 1/1999 | Van De Vanter |
| 5,875,448 A | 2/1999 | Boys et al. |
| 5,956,400 A | 9/1999 | Chaum et al. |

(Continued)

FOREIGN PATENT DOCUMENTS

WO 2016138141 A1 9/2016

OTHER PUBLICATIONS

International Search Report and Written Opinion issued in counterpart International Patent Application No. PCT/US2018/042615.

(Continued)

*Primary Examiner* — Cheng-Feng Huang
(74) *Attorney, Agent, or Firm* — Brian J. Colandreo; Michael T. Abramson; Holland & Knight LLP (57) ABSTRACT A method, computer program product, and computing system for receiving content from a third-party. The content may be processed to predict the disclosure of sensitive information. The sensitive information may be obscured from a platform user, where the third-party may be a customer and the platform user may be a customer service representative.

15 Claims, 2 Drawing Sheets

(56) References Cited

U.S. PATENT DOCUMENTS

| | | |
|---|---|---|
| 6,031,526 A | 2/2000 | Shipp |
| 6,374,225 B1 | 4/2002 | Hejna, Jr. |
| 6,415,256 B1 | 7/2002 | Ditzik |
| 6,438,545 B1 | 8/2002 | Beauregard et al. |
| 6,738,784 B1 | 5/2004 | Howes |
| 6,766,297 B1 | 7/2004 | Lamer et al. |
| 6,839,669 B1 | 1/2005 | Gould et al. |
| 6,865,258 B1 | 3/2005 | Polycn |
| 6,950,994 B2 | 9/2005 | Dharap |
| 6,961,699 B1 | 11/2005 | Kahn et al. |
| 6,996,445 B1 | 2/2006 | Kamijo |
| 7,016,844 B2 | 3/2006 | Othmer et al. |
| 7,236,932 B1 | 6/2007 | Grajski |
| 7,650,628 B2 | 1/2010 | Zimmerman et al. |
| 7,689,900 B1 | 3/2010 | Fifield et al. |
| 7,714,878 B2 | 5/2010 | Gabay et al. |
| 8,209,185 B2 | 6/2012 | Claudatos et al. |
| 8,229,742 B2 | 7/2012 | Zimmerman et al. |
| 8,745,693 B2 | 6/2014 | Zimmerman et al. |
| 2002/0072934 A1 | 6/2002 | Ross et al. |
| 2002/0188452 A1 | 12/2002 | Howes |
| 2003/0046080 A1 | 3/2003 | Hejna, Jr. |
| 2003/0046350 A1 | 3/2003 | Chintalapati et al. |
| 2003/0067495 A1 | 4/2003 | Pu et al. |
| 2003/0105632 A1 | 6/2003 | Huitouze et al. |
| 2004/0006464 A1 | 1/2004 | Geppert et al. |
| 2004/0030704 A1 | 2/2004 | Stefanchik et al. |
| 2004/0064317 A1 | 4/2004 | Othmer et al. |
| 2004/0193910 A1* | 9/2004 | Moles ............... G06F 21/62 726/27 |
| 2005/0149747 A1 | 7/2005 | Wesinger, Jr. et al. |
| 2005/0216531 A1 | 9/2005 | Blandford |
| 2005/0283475 A1 | 12/2005 | Beranek et al. |
| 2006/0075243 A1 | 4/2006 | Lakamp et al. |
| 2006/0089857 A1 | 4/2006 | Zimmerman et al. |
| 2006/0206943 A1 | 9/2006 | Ellison et al. |
| 2006/0253895 A1 | 11/2006 | Brandofino et al. |
| 2006/0272025 A1 | 11/2006 | Mononen |
| 2007/0118751 A1 | 5/2007 | Parlett et al. |
| 2007/0143857 A1 | 6/2007 | Ansari |
| 2007/0136058 A1 | 8/2007 | Jeong et al. |
| 2007/0185712 A1 | 8/2007 | Jeong et al. |
| 2007/0225980 A1 | 9/2007 | Sumita |
| 2007/0225981 A1 | 9/2007 | Kim |
| 2007/0250920 A1* | 10/2007 | Lindsay ............... G07F 7/1025 726/7 |
| 2007/0256139 A1 | 11/2007 | Gaos et al. |
| 2007/0266252 A1 | 11/2007 | Davis et al. |
| 2007/0283444 A1 | 12/2007 | Jang |
| 2007/0294745 A1 | 12/2007 | Tan et al. |
| 2007/0300287 A1 | 12/2007 | Wynne et al. |
| 2008/0022113 A1 | 1/2008 | Moskowitz |
| 2008/0059174 A1 | 3/2008 | Hershey et al. |
| 2008/0059799 A1 | 3/2008 | Scarlata |
| 2008/0114837 A1 | 5/2008 | Biggs et al. |
| 2008/0170693 A1* | 7/2008 | Spies ............... G06F 21/6245 380/277 |
| 2009/0183237 A1* | 7/2009 | Cortes ............... G06F 9/453 726/4 |
| 2009/0196427 A1 | 8/2009 | Krishnapuram et al. |
| 2010/0162354 A1 | 6/2010 | Zimmerman et al. |
| 2010/0162355 A1 | 6/2010 | Zimmerman et al. |
| 2014/0047551 A1* | 2/2014 | Nagasundaram ..... G06F 21/606 726/26 |
| 2014/0207491 A1 | 7/2014 | Zimmerman et al. |
| 2015/0172257 A1* | 6/2015 | Truitt ............... H04L 63/0428 726/7 |
| 2015/0281446 A1 | 10/2015 | Milstein et al. |
| 2017/0134577 A1* | 5/2017 | Wold ............... G10L 17/00 |
| 2018/0219917 A1* | 8/2018 | Chiang ............... G06Q 10/0635 |

OTHER PUBLICATIONS

Batty, S. V. et al., "The Development of a portable real-time Display of Voice Source Characteristics", Euromicro 2000, Proceedings of the 26th Euromicro Conference, vol. Ii, Maastricht, the Netherlands, Sep. 5-7, 2000, pp. 419-422.

Rind, D. et al., Real and Imagined Barriers to an Electronic Medical Record, Center for Clinical Computing, AMIA, Harvard Medical School, Boston, MA (1993), 5 pages.

Torre, D. et al., "Automatic Alternative Transcription Generation and Vocabulary Selection for Flexible Word Recognizers", IEEE 1997, Proceedings of the 1997 IEEE International Conference on Acoustics, Speech, and Signal Processing, vol. 2, pp. 1463-1466 (1997).

Non-Final Office Action issued in related Application U.S. Appl. No. 14/225,167 dated Mar. 24, 2017.

Non-Final Office Action issued in related Application U.S. Appl. No. 14/225,167 dated Aug. 4, 2017.

Non-Final Office Action issued in relation U.S. Appl. No. 14/225,167 dated Feb. 23, 2018.

Final Office Action issued in relation U.S. Appl. No. 14/225,167 dated Sep. 20, 2018.

Non-Final Office Action issued in related U.S. Appl. No. dated Oct. 4, 2019.

Final Office Action issued in related U.S. Appl. No. 14/225,167 dated Apr. 13, 2020.

Non-Final Office Action issued in related U.S. Appl. No. 10/970,617 dated Jan. 15, 2008.

Final Office Action issued in related U.S. Appl. No. 10/970,617 dated Apr. 29, 2008.

Non-Final Office Action issued in related U.S. Appl. No. 10/970,617 dated Jan. 9, 2009.

Final Office Action issued in related U.S. Appl. No. 10/970,617 dated Jul. 14, 2009.

Notice of Allowance issued in related U.S. Appl. No. 10/970,617 dated Oct. 27, 2009.

Non-Final Office Action issued in related U.S. Appl. No. 12/688,758 dated Oct. 18, 2011.

Notice of Allowance issued in related U.S. Appl. No. 12/688,758 dated Mar. 23, 2012.

Non-Final Office Action issued in related U.S. Appl. No. 12/688,745 dated Mar. 14, 2013.

Notice of Allowance issued in related U.S. Appl. No. 12/688,745 dated Dec. 23, 2013.

* cited by examiner

AUTOMATED OBSCURING SYSTEM AND METHOD

RELATED APPLICATION(S)

This application claims the benefit of U.S. Provisional Application No. 62/535,101, filed on 20 Jul. 2017, the entire contents of which are incorporated herein by reference.

TECHNICAL FIELD

This disclosure relates to systems and methods for obscuring data and, more particularly, to automated systems and methods for obscuring sensitive information.

BACKGROUND

In many interactions between people (e.g., a customer calling a business and the customer service representative that handles the call), sensitive information (SPI) may be exchanged. Examples of such sensitive information may include but are not limited to credit card numbers (and expiration dates/CVVs), customer passcodes & PINs, social security numbers, bank account numbers, driver's license numbers, taxpayer identification numbers, home addresses, medical records, health information, and so on. Further and for the avoidance of discrimination, such sensitive information may also include items indicating race, gender, age, etc. For obvious reasons, it may be desirable to only provide sensitive information on a need to know basis and, therefore, to only some of the participants of a conversation.

SUMMARY OF DISCLOSURE

In one implementation, a computer-implemented method is executed on a computing device and includes: receiving content from a third-party; processing the content to predict the disclosure of sensitive information; and obscuring the sensitive information from a platform user.

One or more of the following features may be included. The third-party may be a customer and the platform user is a customer service representative. Processing the content to predict the disclosure of sensitive information may include: converting non-text content into text-based content; and processing the text-based content to predict the disclosure of sensitive information. Processing the content to predict the disclosure of sensitive information may include one or more of: examining the content for cues provided by the third-party; examining the content for cues provided by the platform user; and monitoring a workflow being followed by the platform user, wherein prediction of disclosure is utilized to bias analysis in order to increase the likelihood of obscuring sensitive information. Obscuring the sensitive information from the platform user may include one or more of: blocking the content from the platform user; providing a filler audio signal to the platform user; and providing garbled content to the platform user. Solicitation of superfluous sensitive information by a platform user from a third-party may be proactively monitored. In the event that superfluous sensitive information is being solicited, an alarm procedure may be initiated. A language of the content may be determined.

In another implementation, a computer program product resides on a computer readable medium and has a plurality of instructions stored on it. When executed by a processor, the instructions cause the processor to perform operations including receiving content from a third-party; processing the content to predict the disclosure of sensitive information; and obscuring the sensitive information from a platform user.

One or more of the following features may be included. The third-party may be a customer and the platform user is a customer service representative. Processing the content to predict the disclosure of sensitive information may include: converting non-text content into text-based content; and processing the text-based content to predict the disclosure of sensitive information. Processing the content to predict the disclosure of sensitive information may include one or more of: examining the content for cues provided by the third-party; examining the content for cues provided by the platform user; and monitoring a workflow being followed by the platform user, wherein prediction of disclosure is utilized to bias analysis in order to increase the likelihood of obscuring sensitive information. Obscuring the sensitive information from the platform user may include one or more of: blocking the content from the platform user; providing a filler audio signal to the platform user; and providing garbled content to the platform user. Solicitation of superfluous sensitive information by a platform user from a third-party may be proactively monitored. In the event that superfluous sensitive information is being solicited, an alarm procedure may be initiated. A language of the content may be determined.

In another implementation, a computing system includes a processor and memory is configured to perform operations including receiving content from a third-party; processing the content to predict the disclosure of sensitive information; and obscuring the personal sensitive information from a platform user.

One or more of the following features may be included. The third-party may be a customer and the platform user is a customer service representative. Processing the content to predict the disclosure of sensitive information may include: converting non-text content into text-based content; and processing the text-based content to predict the disclosure of sensitive information. Processing the content to predict the disclosure of sensitive information may include one or more of: examining the content for cues provided by the third-party; examining the content for cues provided by the platform user; and monitoring a workflow being followed by the platform user, wherein prediction of disclosure is utilized to bias analysis in order to increase the likelihood of obscuring sensitive information. Obscuring the sensitive information from the platform user may include one or more of: blocking the content from the platform user; providing a filler audio signal to the platform user; and providing garbled content to the platform user. Solicitation of superfluous sensitive information by a platform user from a third-party may be proactively monitored. In the event that superfluous sensitive information is being solicited, an alarm procedure may be initiated. A language of the content may be determined.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
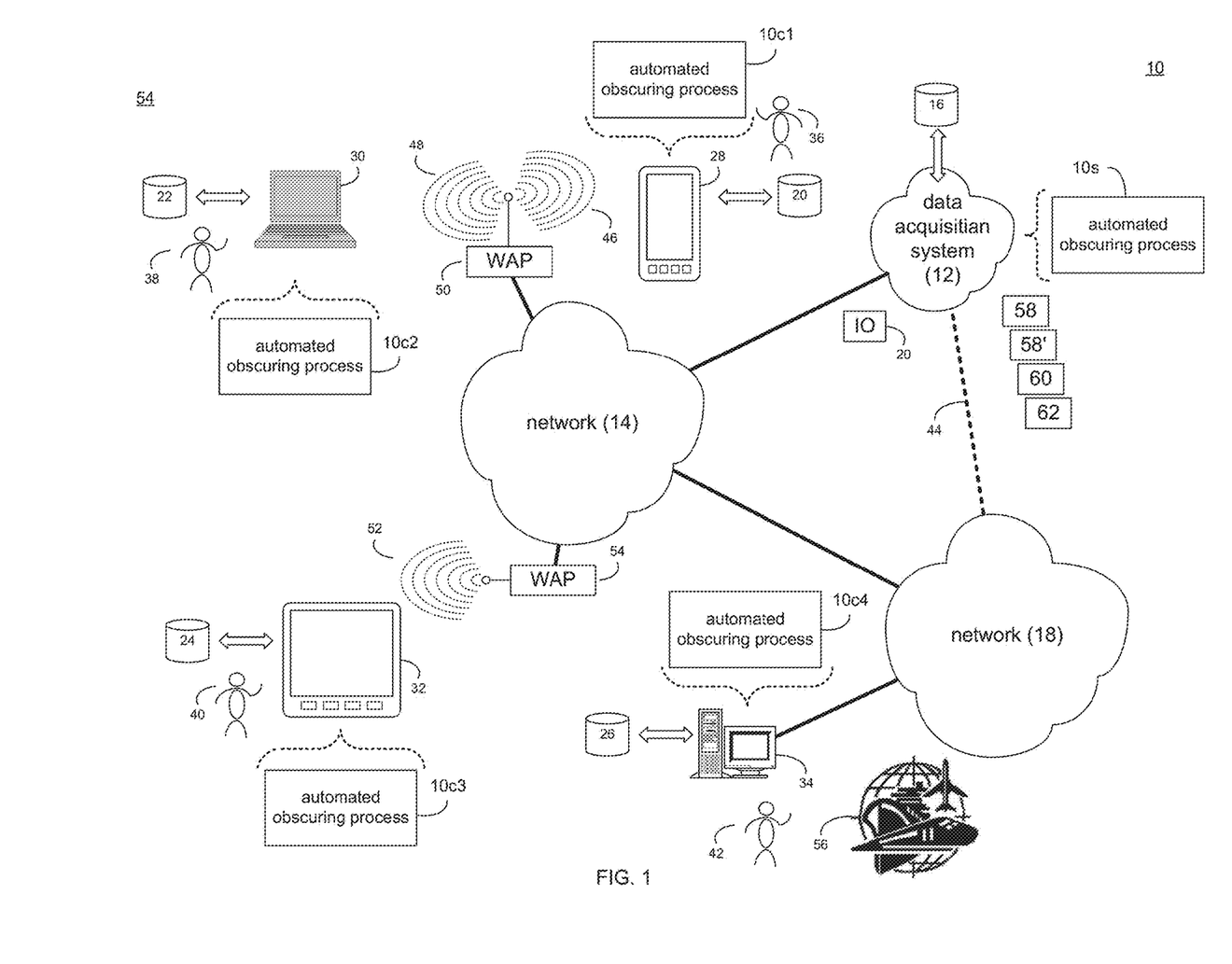
FIG. 1 is a diagrammatic view of a data acquisition system and an automated obscuring process coupled to a distributed computing network.

System Overview:

Referring to FIG. 1, there is shown automated obscuring process 10. As will be discussed below in greater detail, automated obscuring process 10 may be configured to automate the obscurance of sensitive information that is provided to data acquisition system 12.

Automated obscuring process 10 may be implemented as a server-side process, a client-side process, or a hybrid server-side/client-side process. For example, automated obscuring process 10 may be implemented as a purely server-side process via automated obscuring process 10s. Alternatively, automated obscuring process 10 may be implemented as a purely client-side process via one or more of automated obscuring process 10c1, automated obscuring process 10c2, automated obscuring process 10c3, and automated obscuring process 10c4. Alternatively still, automated obscuring process 10 may be implemented as a hybrid server-side/client-side process via automated obscuring process 10s in combination with one or more of automated obscuring process 10c1, automated obscuring process 10c2, automated obscuring process 10c3, and automated obscuring process 10c4.

Accordingly, automated obscuring process 10 as used in this disclosure may include any combination of automated obscuring process 10s, automated obscuring process 10c1, automated obscuring process 10c2, automated obscuring process 10c3, and automated obscuring process 10c4.

Automated obscuring process 10s may be a server application and may reside on and may be executed by data acquisition system 12, which may be connected to network 14 (e.g., the Internet or a local area network). Data acquisition system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, one or more software applications, one or more software platforms, a cloud-based computational system, and a cloud-based storage platform.

As is known in the art, a SAN may include one or more of a personal computer, a server computer, a series of server computers, a mini computer, a mainframe computer, a RAID device and a NAS system. The various components of data acquisition system 12 may execute one or more operating systems, examples of which may include but are not limited to: Microsoft Windows Server™; Redhat Linux™, Unix, or a custom operating system, for example.

The instruction sets and subroutines of automated obscuring process 10s, which may be stored on storage device 16 coupled to data acquisition system 12, may be executed by one or more processors (not shown) and one or more memory architectures (not shown) included within data acquisition system 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from automated obscuring process 10s, automated obscuring process 10c1, automated obscuring process 10c2, automated obscuring process 10c3 and/or automated obscuring process 10c4 to data acquisition system 12. Examples of IO request 20 may include but are not limited to data write requests (i.e. a request that content be written to data acquisition system 12) and data read requests (i.e. a request that content be read from data acquisition system 12).

The instruction sets and subroutines of automated obscuring process 10c1, automated obscuring process 10c2, automated obscuring process 10c3 and/or automated obscuring process 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 20, 22, 24, 26 may include but are not limited to: hard disk drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, tablet computer 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access analysis process 10 directly through network 14 or through secondary network 18. Further, automated obscuring process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal tablet computer 32 is shown wirelessly coupled to network 14 via wireless communication channel 52 established between tablet computer 32 and wireless access point (i.e., WAP) 54, which is shown directly coupled to network 14. Additionally, personal computer 34 is shown directly coupled to network 18 via a hardwired network connection.

The Data Acquisition System:

As will be discussed below in greater detail, data acquisition system 12 may be configured to acquire data that is provided by a third-party (e.g., a customer) to a platform user (e.g., a customer service representative) during an engagement (e.g., a conversation). For example, a customer may call a sales phone line to purchase a product, or a customer, may call a reservation line to book air travel, or a customer may call a feedback line to provide feedback concerning a product purchased or a service received.

During such engagements (e.g., conversations), the third-party (e.g., a customer) may provide the platform user (e.g., a customer service representative) with sensitive information, example of which may include but are not limited to: social security numbers; bank account numbers; passport information; healthcare related information; medical insurance information; student information; credit card information; debit card information; driver's license information, gender/race/age information, and state ID information. This sensitive information may be personal information, commercial information, or some other type of information that is generally not for public access/consumption. This sensitive information may be: verbal sensitive information (as spoken by the third-party during a phone call); text-based sensitive information (as typed by the third-party via a messaging application); and/or tone-based sensitive information (as entered by the third-party via a telephone keypad). Additionally, this sensitive information may be included within a external document. For example, the third-party (e.g., a customer) may provide a link to a shared document (e.g., such as a Google document).

In the interest of enhancing security concerning such sensitive information, automated obscuring process 10 may be configured to automate the obscurance of such sensitive information prior to it being provided to the platform user (e.g., the customer service representative).

The Automated Obscuring Process:

Assume for the following example that the customer service representative (e.g., user 42) is an employee of travel agency 56 and that the third-party (e.g., user 36) is a customer who contacts travel agency 56 to book a vacation. Accordingly and during the interaction between the customer service representative (e.g., user 42) and the third-party (e.g., user 36), information may be exchanged concerning travel dates, destinations, accommodations, etc. Additionally and during such interaction, sensitive information (e.g., social security numbers; bank account numbers; passport information; healthcare related information; medical insurance information; student information; credit card information; debit card information; driver's license information, gender/race/age information, and state ID information) may be provided from the third-party (e.g., user 36) to the customer service representative (e.g., user 42). And in the interest of data privacy and protection, automated obscuring process 10 may be configured to automate the obscurance of such sensitive information prior to it being provided to the platform user (e.g., the customer service representative), even though such information is still received and processed by data acquisition system 12.

Figure 2:
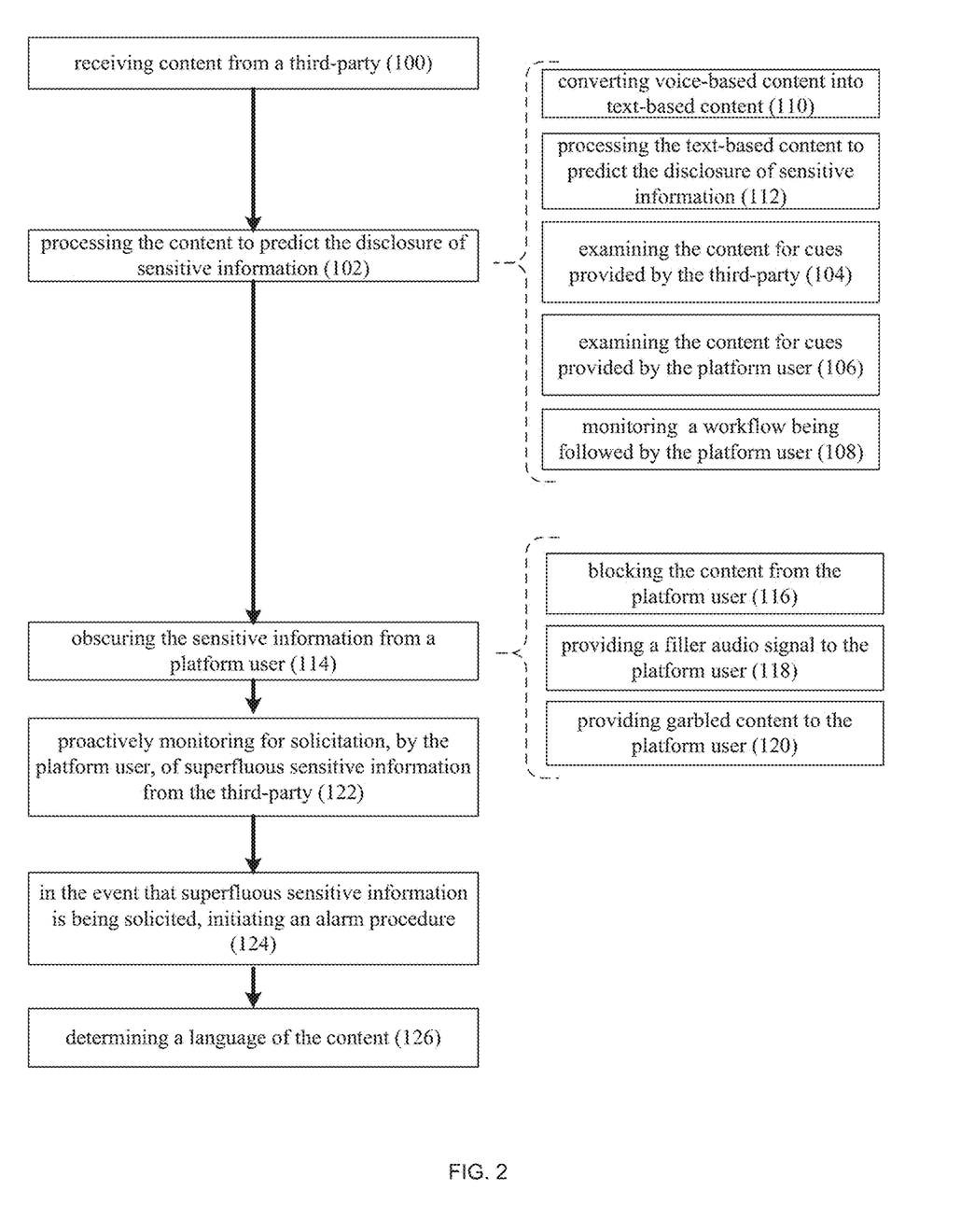
FIG. 2 is a flow chart of one implementation of the automated obscuring process of FIG. 1.

Referring also to FIG. 2, automated obscuring process 10 may receive 100 content (e.g., content 58) from a third-party (e.g., user 36). As discussed above, examples of this sensitive information may include but are not limited to: verbal sensitive information; text-based sensitive information; and/or tone-based sensitive information. As discussed above, an example of this third-party (e.g., user 36) may be a customer of (in this example) travel agency 56. For example, assume that whenever a representative of travel agency 56 receives a call, data acquisition system 12 may be activated to capture some or all of content (e.g., content 58) and automated obscuring process 10 may be activated to obscure sensitive information (included within content 58) prior to it being provided to the platform user (e.g., the customer service representative), Some embodiments of data acquisition system 12 may include a validation process, wherein data acquisition system 12 may automatically re-prompt the third-party (e.g., user 36) to resubmit their sensitive information if the original collection was invalid (e.g., not the right quantity of digits, inconsistent with known information about the third-party, checksum failure, etc.). Further, data acquisition system 12 may be configured to engage the third-party (e.g., user 36) in more complex sub-dialog, for instance when collecting a credit card number in groups of four digits and reading them back to the third-party (e.g., user 36) for confirmation after each group of digits.

Data acquisition system 12 may be configured synthesize the voice of the customer service representative (e.g., user 42) to make the user experience as seamless as possible. Further embodiments of data acquisition system 12 may distinguish between the collection of new sensitive information versus the verification of existing sensitive information, thus enabling the appropriate validation process to be effectuated in each case. For example and through the use of data acquisition system 12, additional content may be sought from this third-party (e.g., user 36). Accordingly, data acquisition system 12 may analyze the conversation between the third-party (e.g., user 36) and the customer service representative (e.g., user 42). Further, data acquisition system 12 may synthesize the voice of the customer service representative (e.g., user 42) and ask questions of the third-party (e.g., user 36), wherein data acquisition system 12 may analyze the answers provided by the third-party (e.g., user 36) and ask follow-up questions if needed.

Accordingly and upon automated obscuring process 10 receiving 100 content (e.g., content 58) from a third-party (e.g., user 36), automated obscuring process 10 may process 102 the content (e.g., content 58) to predict the disclosure of sensitive information.

Continuing with the above-stated example, assume that a customer service representative (e.g., user 42) of travel agency 56 receives a call from a third-party (e.g., user 36), thus resulting in data acquisition system 12 being activated to capture some or all of content (e.g., content 58) and automated obscuring process 10 being activated to obscure sensitive information (included within content 58) prior to it being provided to the platform user (e.g., the customer service representative).

Accordingly and when processing 102 the content (e.g., content 58) to predict the disclosure of sensitive information, automated obscuring process 10 may examine 104 the content (e.g., content 58) for cues provided by the third-party (e.g., user 36) and/or may examine 106 the content (e.g., content 58) for cues provided by the platform user (e.g., user 42).

So for this example, assume that automated obscuring process 10 is configured to continuously monitor conversations between e.g., the third-party (e.g., user 36) and the platform user (e.g., user 42) for the occurrence of certain utterances by the third-party (e.g., user 36) or the platform user (e.g., user 42), wherein these utterances may be indicative of an upcoming disclosure of sensitive information.

Example of such utterances by the platform user (e.g., user 42) may include but are not limited to: "Can you tell me your age?", "Can I have your social security number?", and "Can I have your credit card number?". Example of such utterances by the third-party (e.g., user 36) may include but are not limited to: "I am 39 years old.", "My social security number is . . . ", and "My credit card number is . . . ".

Accordingly and when processing 102 the content (e.g., content 58) to predict the disclosure of sensitive information, automated obscuring process 10 may examine 104 the content (e.g., content 58) for cues (e.g., "I am 39 years old.", "My social security number is . . . ", and "My credit card number is . . . ") spoken by the third-party (e.g., user 36) and/or may examine 106 the content (e.g., content 58) for cues (e.g.: "Can you tell me your age?", "Can I have your social security number?", and "Can I have your credit card number?") spoken by the platform user (e.g., user 42).

In addition to monitoring for cues (e.g., utterances) made by the third-party (e.g., user 36) and/or the platform user (e.g., user 42), when processing 102 the content (e.g., content 58) to predict the disclosure of sensitive information, automated obscuring process 10 may monitor 108 a workflow (e.g., an automated script) being followed by the platform user (e.g., user 42) or being populated by the third-party (e.g., user 36). For example, the platform user (e.g., user 42) may utilize data acquisition system 12 to acquire data, wherein data acquisition system 12 maybe configured to provide data fields: to be populated by the platform user (e.g., user 42) with information provided by the third-party (e.g., user 36); or to be populated by the third-party (e.g., user 36) directly. Accordingly, data acquisition system 12 may render e.g., client information fields, travel destination fields, credit card payment information fields, etc., all of which may be populated by the platform user (e.g., user 42) with information provided by the third-party (e.g., user 36); or may be populated by the third-party (e.g., user 36) directly. Accordingly and when monitoring 108 such a workflow (e.g., the above-described automated script) being followed by the platform user (e.g., user 42) or populated by the third-party (e.g., user 36) wherein e.g., a credit card payment information field is rendered by data acquisition system 12 for population by platform user (e.g., user 42) or the third-party (e.g., user 36), the rendering of this field may perform the function of a "cue" indicative of the upcoming disclosure of sensitive information (namely credit card information).

While the above-described implementations of automated obscuring process 10 are described above as directly processing content (e.g., content 58), this is for illustrative purpose only and is not intended to be a limitation of this disclosure, as other configurations are possible and are considered to be within the scope of this disclosure. For example and depending upon the manner in which automated obscuring process 10 is configured, automated obscuring process 10 may be configured to process text-based content. Accordingly and when processing 102 the content to predict the disclosure of sensitive information; automated obscuring process 10: may convert 110 non-text content (e.g., content 58) into text-based content (e.g., content 58'); and may then process 112 the text-based content (e.g., content 58') to predict the disclosure of sensitive information. For example, automated obscuring process 10: may first convert 110 non-text content (e.g., content 58) into text-based content (e.g., content 58') using e.g., various speech-to-text platforms or applications (e.g., such as those available from Nuance Communications, Inc. of Burlington, Mass.), thus generating the text-based content (e.g., content 58') that may then be processed 112 to predict the disclosure of sensitive information.

Some embodiments of automated obscuring process 10 may choose to specialize the conversion of non-text-based content into text-based content of the third-party (e.g., user 36) based upon cues from the platform user (e.g., user 42) or the workflow. Specialization may take the form of loading appropriate grammars (e.g., digits grammars, alphanumeric grammars, address grammars, etc.), or these in combination with topical language models, or these in addition to adjusting the weighset contributions of contributing recognition objects or other forms of specialization. Specialization may be equally applicable to processing text-based content (semantic understanding): a platform user or workflow cue may be used to increase bias, promoting semantic results that are closer to the expected result type. Beyond re-ranking semantic results, a platform user or workflow cue representing the intent of the dialog turn may compensate for a lack of context in the text of a partial utterance or phrase being semantically analysed. Accordingly, automated obscuring process 10 may upgrade the observed concept (for example, from NUMBER to CVV) based upon the intent attributed to the platform user or workflow cue.

In response to predicting the disclosure of sensitive information by: examining 104 the content (e.g., content 58) provided by the third-party (e.g., user 36); examining 106 the content (e.g., content 58) provided by the platform user (e.g., user 42); and/or monitoring 108 a workflow (e.g., an automated script) being followed by the platform user (e.g., user 42), automated obscuring process 10 may obscure 114 the sensitive information from the platform user (e.g., user 42). As discussed above, an example of this platform user (e.g., user 42) may include a customer service representative of travel agent 56.

As discussed above, assume that a customer service representative (e.g., user 42) of travel agency 56 receives a call from a third-party (e.g., user 36) resulting in data acquisition system 12 being activated to capture some or all of content (e.g., content 58) and automated obscuring process 10 being activated to obscure sensitive information (included within content 58) prior to it being provided to the platform user (e.g., the customer service representative). Further, assume that in the manner discussed above, automated obscuring process 10 predicts the disclosure of sensitive information (e.g., credit card information). Accordingly and in response to such prediction, automated obscuring process 10 may obscure 114 the sensitive information from the platform user (e.g., user 42). Further, while automated obscuring process 10 may obscure 114 the sensitive information from being disclosed to the platform user (e.g., user 42), the sensitive information (e.g., credit card information) may be provided to and received by data acquisition system 12. Accordingly, data acquisition system 12 may still receive and process this sensitive information (e.g., credit card information) even though automated obscuring process 10 obscures 114 the sensitive information from the platform user (e.g., user 42), wherein the manner in which this sensitive information is obscured 114 may occur in various ways.

Accordingly and when obscuring 114 the sensitive information (e.g., credit card information) from the platform user (e.g., user 42), automated obscuring process 10 may block 116 the content (e.g., content 58) from the platform user (e.g., user 42). For example and upon predicting the upcoming disclosure of sensitive information (namely credit card information), automated obscuring process 10 may obscure 114 the sensitive information by e.g., cutting off the audio signal being provided to the platform user (e.g., user 42) to block 116 the content (e.g., content 58) from the platform user (e.g., user 42). As discussed above, data acquisition system 12 may receive and process the sensitive information (e.g., credit card information) even though automated obscuring process 10 blocked 116 the content (e.g., content 58) from the platform user (e.g., user 42).

Additionally and when obscuring 114 the sensitive information (e.g., credit card information) from the platform user (e.g., user 42), automated obscuring process 10 may provide 118 a filler audio signal (e.g., filler audio signal 50) to the platform user (e.g., user 42). For example and upon predicting the upcoming disclosure of sensitive information (namely credit card information), automated obscuring process 10 may obscure 114 the sensitive information by e.g., replacing the content (e.g., content 58) with a static signal (e.g., filler audio signal 60) that is provided 118 to the platform user (e.g., user 42) instead of providing the content (e.g., content 58) to the platform user (e.g., user 42). As discussed above, data acquisition system 12 may receive and process the sensitive information (e.g., credit card information) even though automated obscuring process 10 provided 118 a filler audio signal (e.g., filler audio signal 60) to the platform user (e.g., user 42). Further, automated obscuring process 10 and/or data acquisition system 12 may be configured to provide feedback to the third-party (e.g., user 36) confirming that a) the sensitive information was successfully collected; or b) the sensitive information was not successfully collected (e.g., due to an invalid social security number being entered).

Further and when obscuring 114 the sensitive information (e.g., credit card information) from the platform user (e.g., user 42), automated obscuring process 10 may provide 120 garbled content (e.g., content 62) to the platform user (e.g., user 42). For example and upon predicting the upcoming disclosure of sensitive information (namely credit card information), automated obscuring process 10 may obscure 114 the sensitive information by e.g., replacing the content (e.g., content 58) with garbled content (e.g., content 62) that is provided 120 to the platform user (e.g., user 42) instead of providing the content (e.g., content 58) to the platform user (e.g., user 42). Garbled content (e.g., content 62) may be a distorted (i.e., unintelligible) version of content (e.g., content 58). As discussed above, data acquisition system 12 may receive and process the sensitive information (e.g., credit card information) even though automated obscuring process 10 provided 120 garbled voice-based content (e.g., content 62) to the platform user (e.g., user 42).

While the above-described examples generally concern voice-based sensitive information, this is for illustrative purposes only and is not intended to be a limitation of this disclosure, as other configurations are possible and are considered to be within the scope of this disclosure. As discussed above, the sensitive information may be: verbal sensitive information (e.g., as spoken by the third-party during a phone call); text-based sensitive information (e.g., as typed by the third-party via a messaging application); and/or tone-based sensitive information (e.g., as entered by the third-party via a telephone keypad). Accordingly, the sensitive information received by automated obscuring process 10 may be in the form of text provided by the third-party (e.g., user 36) during a "chat" session concerning e.g., their social security number. In such a configuration, automated obscuring process 10 may obscure this text-based information so that it is not seen by the platform user (e.g., user 42). Further, the sensitive information received by automated obscuring process 10 may be in the form of DTMF touch-tone signals that are generated when the third-party (e.g., user 36) provides e.g., their credit card information using the touch pad of their telephone. In such a configuration, automated obscuring process 10 may obscure these touch tones so that they are not heard by the platform user (e.g., user 42). Additionally and as discussed above, this sensitive information may be included within an external document. For example, the third-party (e.g., a customer) may provide a link to a shared document (e.g., such as a Google document). In such a configuration, automated obscuring process 10 may process this external document to determine if the external document includes any sensitive information. If it does not include sensitive information, the link may be provided to the platform user (e.g., user 42). And if the external document does contain any sensitive information, a redacted version of the external document (that obscures the sensitive information) may be provided to the platform user (e.g., user 42).

Tuning the Automated Obscuring Process:

As discussed above, automated obscuring process 10 may be configured to predict the disclosure of sensitive information by: examining 104 the content (e.g., content 58) provided by the third-party (e.g., user 36); examining 106 the content (e.g., content 58) provided by the platform user (e.g., user 42); and/or monitoring 108 a workflow (e.g., an automated script) being followed by the platform user (e.g., user 42). As would be expected, the manner in which automated obscuring process 10 is configured may vary the quantity of false-positives that may occur when making such predictions. For example, assume that the sensitive information is a credit card number, wherein credit card numbers are often 16 digits long.

Accordingly and in one extreme, assume that automated obscuring process 10 is configured to predict that sensitive information is likely to be disclosed if a single digit is provided to the platform user (e.g., user 42) by the third-party (e.g., user 36), wherein automated obscuring process 10 may then obscure 114 what it believes will be sensitive information. Unfortunately, while a system configured in such a manner may be very secure with respect to obscuring sensitive information, such a system may produce a considerable number of false positives (e.g., if user 36 says that they have been "on hold since 12:30").

Alternatively and at the other end of the spectrum, automated obscuring process 10 may be configured to predict that sensitive information is likely to be disclosed only after fourteen digits are provided to the platform user (e.g., user 42) by the third-party (e.g., user 36), wherein automated obscuring process 10 may then obscure 114 what it believes will be sensitive information. Unfortunately, while a system configured in such a manner may result in a few false positives, such a system may be lacking with respect to obscuring sensitive information, since such a system may allow a large portion of the sensitive information to be provided to the platform user (e.g., user 42) prior to it being obscured.

Accordingly, automated obscuring process 10 may be configured to balance the level of false positives generated versus the level of security with respect to the sensitive information.

Depending upon how the sensitivity of automated obscuring process 10 is configured (and as discussed above), automated obscuring process 10 may begin obscuring content (e.g., content 62) based upon a prediction. Understandably, some of these predictions may be false positives. Continuing with the above-stated example, assume that the platform user (e.g., user 42) says to the third-party (e.g., user 36) "May I please have your credit card number?". Automated obscuring process 10 may detect this "cue" spoken by the platform user (e.g., user 42) and may begin to obscure 114 what it believes will be sensitive information. Assume that in response to the platform user (e.g., user 42) saying "May I please have your credit card number?". the third-party (e.g., user 36) says "Before we get to that, what is your cancellation policy?" Accordingly, this was a false positive. And unfortunately, if the question of the third-party (e.g., user 36) is obscured 114 by automated obscuring process 10, the platform user (e.g., user 42) may never hear (and, therefore, never answer) the question "Before we get to that, what is your cancellation policy?". Accordingly and upon realizing that a false positive occurred, automated obscuring process 10 may replay the obscured content (i.e., the question "Before we get to that, what is your cancellation policy?") to the platform user (e.g., user 42) so that the platform user (e.g., user 42) may answer the question by saying e.g., "A full refund if cancelled within 30 days of purchase". In order to avoid undesirable delays, the content that was obscured due to the false positive may be replayed for the platform user (e.g., user 42) at a higher playback rate (e.g., 1.5×) so that the platform user (e.g., user 42) may be brought back up to speed more quickly. When effectuating such a higher playback rate, automated obscuring process 10 may employ methodologies to maintain the appropriate voice pitch and/or to remove/truncate any periods of silence. During any periods of silence, automated obscuring process 10 may provide prompts to the platform user (e.g., user 42) so that the platform user knows what is going on (e.g., that the third-party (e.g., user 36) is providing sensitive information to automated obscuring process 10).

Optional Features:

In order to further enhance the security of the above-described sensitive information, automated obscuring process 10 may be configured to proactively monitor 122 for solicitation, by the platform user (e.g., user 42), of superfluous sensitive information from the third-party (e.g., user 36). For example, automated obscuring process 10 may be configured to continuously monitor 120 the entire conversation between the platform user (e.g., user 42) and the third-party (e.g., user 36). This monitored conversation may be processed (using e.g., standard artificial intelligence processes, machine learning methodologies and/or natural language processing techniques) to detect if e.g., the platform user (e.g., user 42) is soliciting such superfluous sensitive information from the third-party (e.g., user 36). In the event that superfluous sensitive information is being solicited, automated obscuring process 10 may initiate 124 an alarm procedure, examples of which may include but are not limited to: notifying a supervisor of the platform user (e.g., user 42); abruptly ending the conversation between the platform user (e.g., user 42) and the third-party (e.g., user 36); and obscuring the superfluous sensitive information (e.g., credit card information) from the platform user (e.g., user 42).

As could be imagined, the language of the conversation between the platform user (e.g., user 42) and the third-party (e.g., user 36) may vary depending upon geographic region and target market. Accordingly, automated obscuring process 10 may be configured to determine 126 a language of the content (e.g., content 58) so that the content may be properly analyzed to make the above-described prediction concerning the disclosure of sensitive information.

Automated obscuring process 10 may be configured to provide the platform user (e.g., user 42) with a text-based transcript of the encounter between the platform user (e.g., user 42) and the third-party (e.g., user 36), wherein any sensitive information obtained/disclosed during the encounter may be redacted from the text-based transcript.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    receiving content from a third-party;
    processing the content to predict disclosure of sensitive information in the content received from the third-party, wherein processing the content to predict the disclosure of sensitive information includes, processing text-based content associated with the content to predict the disclosure of sensitive information, and further includes one or more of examining the content for cues provided by the third-party, examining the content for cues provided by the platform user, and monitoring a workflow being followed by the platform user, wherein prediction of the disclosure is utilized to bias analysis in order to increase the likelihood of obscuring sensitive information; and
    obscuring the sensitive information in the content from a platform user, based upon, at least in part, predicting the disclosure of the sensitive information, wherein obscuring the sensitive information from the platform user includes one or more of blocking the content from the platform user, providing a filler audio signal to the platform user, and providing garbled content to the platform user.

2. The computer-implemented method of claim 1 wherein the third-party is a customer and the platform user is a customer service representative.

3. The computer-implemented method of claim 1 wherein processing the content to predict the disclosure of sensitive information includes:
    converting non-text content into text-based content.

4. The computer-implemented method of claim 1 further comprising:
    proactively monitoring for solicitation, by the platform user, of superfluous sensitive information from the third-party; and
    in the event that superfluous sensitive information is being solicited, initiating an alarm procedure.

5. The computer-implemented method of claim 1 further comprising:
    determining a language of the content.

6. A computer program product residing on a non-transitory computer readable medium having a plurality of instructions stored thereon which, when executed by a processor, cause the processor to perform operations comprising:
    receiving content from a third-party;
    processing the content to predict disclosure of sensitive information in the content received from the third-party, wherein processing the content to predict the disclosure of sensitive information includes, processing text-based content associated with the content to predict the disclosure of sensitive information, and further includes one or more of examining the content for cues provided by the third-party, examining the content for cues provided by the platform user, and monitoring a workflow being followed by the platform user, wherein prediction of the disclosure is utilized to bias analysis in order to increase the likelihood of obscuring sensitive information; and
    obscuring the sensitive information in the content from a platform user, based upon, at least in part, predicting the disclosure of the sensitive information, wherein obscuring the sensitive information from the platform user includes one or more of blocking the content from the platform user, providing a filler audio signal to the platform user, and providing garbled content to the platform user.

7. The computer program product of claim 6 wherein the third-party is a customer and the platform user is a customer service representative.

8. The computer program product of claim 6 wherein processing the content to predict the disclosure of sensitive information includes:
converting non-text content into text-based content.

9. The computer program product of claim 6 further comprising:
proactively monitoring for solicitation, by the platform user, of superfluous sensitive information from the third-party; and
in the event that superfluous sensitive information is being solicited, initiating an alarm procedure.

10. The computer program product of claim 6 further comprising:
determining a language of the content.

11. A computing system including a processor and memory configured to perform operations comprising:
receiving content from a third-party;
processing the content to predict disclosure of sensitive information in the content received from the third-party, wherein processing the content to predict the disclosure of sensitive information includes, processing text-based content associated with the content to predict the disclosure of sensitive information, and further includes one or more of examining the content for cues provided by the third-party, examining the content for cues provided by the platform user, and monitoring a workflow being followed by the platform user, wherein prediction of the disclosure is utilized to bias analysis in order to increase the likelihood of obscuring sensitive information; and
obscuring the sensitive information in the content from a platform user, based upon, at least in part, predicting the disclosure of the sensitive information, wherein obscuring the sensitive information from the platform user includes one or more of blocking the content from the platform user, providing a filler audio signal to the platform user, and providing garbled content to the platform user.

12. The computing system of claim 11 wherein the third-party is a customer and the platform user is a customer service representative.

13. The computing system of claim 11 wherein processing the content to predict the disclosure of sensitive information includes:
converting non-text content into text-based content.

14. The computing system of claim 11 further comprising:
proactively monitoring for solicitation, by the platform user, of superfluous sensitive information from the third-party; and
in the event that superfluous sensitive information is being solicited, initiating an alarm procedure.

15. The computing system of claim 11 further comprising:
determining a language of the content.

\* \* \* \* \*